United States Patent Office 3,654,066
Patented Apr. 4, 1972

3,654,066
MANUFACTURE OF A POROUS POLYMERIC SHEET
Osamu Fukushima, Yoshitami Saito, and Yuya Enomoto, Kurashiki, Japan, assignors to Kuraray Co. Ltd., Kurashiki, Japan
No Drawing. Filed Apr. 25, 1969, Ser. No. 819,427
Claims priority, application Japan, May 8, 1968, 43/31,089; May 16, 1968, 43/33,069; May 18, 1968, 43/33,664; May 27, 1968, 43/35,878, 43/35,879; June 8, 1968, 43/39,601, 43/39,602
Int. Cl. B32b 3/26, 27/40
U.S. Cl. 161—160
6 Claims

ABSTRACT OF THE DISCLOSURE

A porous polymeric sheet having a specific gravity of less than 0.7 and a thickness of 0.05 to 2.0 mm. and containing pores inclined at an angle of less than 80° against the plane of the sheet and having a length of 0.03 to 10 mm. A sheet material comprising said porous polymeric sheet and a substrate bound to the lower surface of said porous polymeric sheet. Said porous polymeric sheet is produced by immersing a polymer solution applied to a support into a coagulation bath under a condition of rapid coagulation to coagulate rapidly the upper portion of the solution and to form macropores in the inner portion; stressing the upper portion in transverse direction, that is, a direction parallel to the plane of the support, in the bath to shift the upper portion to transverse direction and to incline the pores formed; treating further the layer with the bath to complete the coagulation, thereby forming porous structure containing pores inclined at an angle of less than 80° against the plane; and peeling off the resulting porous polymeric sheet from the support.

---

The present invention relates to a porous polymeric sheet having a structure similar to leather grain and a method of producing the same. The present invention further concerns leather-like sheet material comprising the porous polymeric sheet and a substrate bound to the polymeric sheet and a method of producing the same.

It has been proposed to produce a sheet material suitable as a substitute for leather by binding a porous polymeric sheet obtained by coagulating a layer of a polymer solution into a porous structure with a substrate or by coagulating a polymer solution applied directly to a substrate into a porous structure. The porous polymeric sheets obtained in these processes have vapor-permeability but they do not resemble leather grain in structure, appearance, texture, drape and fold, since they have pores which are substantially perpendicular to the horizontal plane of the sheet.

It is an object of the present invention to provide a porous polymeric sheet which has structure, appearance, texture, touch, drape and fold similar to leather grain and has good vapor-permeability and to provide a method of producing the same.

Another object of the present invention is to provide a sheet material similar to leather and a method of producing the same.

The present invention consists in a porous polymeric sheet which contains pores inclined at an angle of less than 80°, preferably less than 65° against the plane of the sheet and having a length of 0.03 to 10 mm., preferably 0.05 to 1 mm.

It is preferred that the polymeric sheet has a pore having a diameter of 0.003 to 1.0 mm., preferably 0.02 to 0.60 mm., a specific gravity of less than 0.7 and a thickness of 0.05 to 2.0 mm., preferably 0.1 to 1.0 mm.

In the above polymeric sheet, it is further preferred that the lower portion ranging from 0.01 mm. to 0.1 mm. from the lower surface has a microporous structure, which contains pores having a diameter of substantially less than 0.05 mm., preferably less than 0.03 mm. and the upper portion ranging from 0.01 mm. to 0.1 mm. from the upper surface contains pores having a diameter of substantially 0.0005 to 0.05 mm. and a length of substantially 0.005 to 0.15 mm. and smaller pores than said pores. Particularly, such a polymeric sheet more resembles leather grain that the total sum of volume of pores having a length of 0.03 to 10 mm. and a diameter of 0.02 to 0.60 mm., which are present in the inner portion, occupies more than $\frac{1}{10}$, preferably $\frac{1}{5}$ of the volume of the total layer.

The present invention further consists in a sheet material which comprises the said porous polymeric sheet and a substrate bound to one surface (preferably the lower surface) of the polymeric sheet.

The substrate includes a woven cloth, a knitted cloth, an unwoven cloth, a laminate of a woven cloth and an unwoven cloth, any of these materials impregnated with a polymer and a paper.

The porous polymeric sheet of this invention has good vapor-permeability. It has a structure and a surface pattern similar to leather grain and has low surface resilience. It is wound resistant and even if it gets a wound, the wound is inconspicuous. The sheet material obtained by binding the porous polymeric sheet with the substrate is similar to leather in texture, touch, appearance, and fold.

The present invention further consists in a method of producing the porous polymeric sheet which comprises: immersing a polymer solution applied to a support into a coagulation bath under a condition of rapid coagulation to coagulate rapidly the upper portion of the solution and to form macropores in the inner portion; stressing the upper portion in transverse direction, that is, a direction parallel to the plane of the support, in the bath to shift the upper portion to transverse direction and to incline the pores formed; treating further the layer with the bath to complete the coagulation, thereby forming a porous structure containing pores inclined at an angle of less than 80° against the plane; and peeling off the resulting porous polymeric sheet from the support.

In the case where the resulting porous polymeric sheet still adheres to the support after coagulation, it may be dried as it is. Whereas, in the case where the polymeric sheet is peeled off naturally from the support after coagulation for lack of affinity between the polymeric sheet and the support, it is important to dry the sheet under a tension in diaxial direction, because if the polymeric sheet is dried as it is, it shrinks and it's surface becomes rough due to the macroporous structure of the polymeric sheet.

It is convenient for stressing the upper portion in transverse direction that the upper portion is contacted with a rotating roll in the bath. It should be carried out while the lower portion still retains fluidity to stress upper portion in transverse direction by this means. The period when the upper portion is stressed by this means is preferably 10 seconds to 2 minutes after the immersion into the bath.

Other means for stressing the upper portion in transverse direction involves immersing the support into the bath at an inclination of more than 20°, preferably, more than 35° against the bath surface or inclining the support at an angle of more than 20°, preferably more than 35° against the bath surface after the support is immersed into a bath. In accordance with this means, it is possible to shift transversely the upper portion early coagulated by the action of gravity. In this process, it is necessary to incline the support in the coagulation bath until the bath liquid penetrates into the inner portion and the lower portion of the polymer solution layer and the inclined structure is fixed and the time is usually about 30 seconds to 4 minutes.

According to the method of this invention, various porous polymeric sheets having different structures may be obtained by varying factor relating to the shift of the upper portion, for example, rotation velocity of the roll, inclination angle, solution viscosity and others and factors relating to the coagulation rate, for example, liquor ratio of coagulation bath, temperature of coagulation bath and others.

As the support, there may be metal belt, films or sheets of various polymers, such as, polyethylene, polypropylene, polyester, polyamide, polyvinyl alcohol, etc., sheets obtained by laminating these films or sheets on woven cloth, unwoven cloth or paper and smooth surfaced sheet obtained by impregnating and coating woven cloth or unwoven cloth with solutions of the above described various polymers and then coagulating the polymer solutions.

As the polymers, various polymers may be used, such as, polyesters, polyesteramides, polyamides, polyvinyl chloride, polyvinyl butyral, poly-α-methylstyrene, polyvinylidene chloride, polyurethane, polymer or copolymer of alkyl esters of acrylic acid or methacrylic acid, chlorinated polyethylene, chlorosulfonated polyethylene, copolymer of butadiene and acrylonitrile, alone or in admixture. It is preferred to use mainly elastomeric polymers. Among the elastomeric polymers, polyurethane elastomer is most preferred.

The polymer solution may be added with various additives, such as pigment, surface active agent, coagulation regulator, filler, softener, waterproofing agents, water repellent, light stabilizer and heat stabilizer. It is usually preferred to use a polymer solution which has a temperature of 20 to 70° C., a viscosity of 1 to 500 poises at 30° C. and a concentration of 5 to 35% by weight.

The useful solvents include N,N-dimethylformamide, N,N - diethylformamide, N,N - dimethylacetamide, dioxane, gamma - butyrolactone, N - methyl - 2 - pyrrolidone, ethyl acetate, toluene, phenol, chloroform, dimethylsulfoxide, tetrahydrofuran and tetramethyl urea. Also useful are blends of these solvents with various liquids, such as water, ketone and alcohol which alone are often poor solvents for the polymer.

As the coagulation bath, a non-solvent for the polymer and the mixture of a non-solvent and a solvent can be used. As the non-solvent, there may be used water, methanol, ethylene glycol, glycerol, hydroxyethyl acetate, glycol monoethyl ether, tert.-butyl alcohol, hexane, benzene, toluene and tetrachloroethylene. When water can be used as the non-solvent, water is most preferred.

According to the method of the present invention it is necessary that the coagulation bath coagulate the polymer in a high speed. As the coagulation bath provided with such a condition, it is preferred to use the non-solvent alone or a mixture of a large amount (preferably, more than 80% by weight) of non-solvent and a small amount (preferably, less than 20% by weight) of solvent. The temperature of the coagulation bath is preferably 25 to 70° C.

The present invention further consists in a method of producing sheet material which comprises binding the porous polymeric sheet obtained by the above mentioned process with the substrate.

In the production of the sheet material by the above mentioned process, when the substrate is bound to the surface of the porous polymeric sheet which has not faced to the support and the surface faced to the support is exposed, a product very similar to leather in the appearance, surface pattern and structure can be obtained.

As the substrate, as already mentioned above, there may be used a woven cloth, a knitted cloth, an unwoven cloth, a laminate of a woven cloth and an unwoven cloth, a laminate of a knitted cloth and an unwoven cloth, any of these materials impregnated with the polymer and a paper.

When the porous polymeric sheet is bound with the substrate, if the porous polymeric sheet is adhered to the support, the binding is more easy and consequently, it is advisable that the peeling off of the porous polymeric sheet from the support is carried out after the porous polymeric sheet is bound with the substrate. Accordingly, after the coagulation, when the porous polymeric sheet is naturally peeled off from the support, it is preferred that the porous polymeric sheet is once adhered slightly to the support and then the substrate is bound to the porous polymeric sheet, after which the support is peeled off.

If the porous polymeric sheet is hot pressed prior to binding with the substrate, the density is raised without influencing the substrate and the inclination of the pores can be made larger, so that a product more similar to leather can be obtained. The product may be subjected to imitation leather workings, such as, coloration, embossing and the like.

The invention will be further explained in detail by the following examples which are not limitative to the scope of the present invention. The parts and percent are by weight unless otherwise indicated.

EXAMPLE 1

In this example, polyurethane elastomer was prepared as follows:

200 parts of polyethylene propylene adipate having hydroxyl groups in both ends and a mean molecular weight of 2,000 12.5 parts of p,p'-diphenylmethane diisocyanate and 24.8 parts of ethylene glycol were charged and mixed in a mixer provided with a crushing mechanism and then added with 61.7 parts of dimethylformamide (hereinafter abridged as DMF) and the resulting mixture was heated and stirred to obtain powdery polyurethane elastomer containing dimethylformamide.

A mix spun filament composed of 50 parts of nylon-6 and 50 parts of polystyrene was cut into staple fibers, and the resulting staple fibers were needle-punched to produce an unwoven fabric having a three-dimensional network structure, which was impregnated with 25% solution of polyurethane elastomer in DMF. The impregnated unwoven fabric was introduced into a coagulation bath at 40° C. containing 40% DMF aqueous solution to coagulate the polyurethane elastomer. Then, polystyrene was extracted and removed in hot toluene, and the surface of the impregnated unwoven fabrics was sliced to obtain a smooth surfaced substrate.

Then, 15% solution of polyurethane elastomer in DMF containing 3% of carbon black as a pigment was kept at 50° C. and flowed on a polyethylene sheet in an atmosphere kept at 45° C. by means of a slit coat system so that the thickness of the elastomer solution was 0.8 mm., and then the sheet was introduced into water at 50° C. at a rate of 1 m./min. and at an angle of 80° and the polyurethane elastomer was coagulated for 15 minutes. The resulting polyurethane elastomer sheet was dried at 70° C. under such a condition that said sheet is stretched 10% based on the width of the coagulated sheet to obtain a porous polyurethane elastomer sheet.

25% solution of polyurethane elastomer in DMF was coated on the surface of the above-described substrate and then on the coated substrate was superposed a surface of the porous polyurethane elastomer sheet, which had not faced to the polyethylene sheet support, and then the substrate and the porous polyurethane elastomer sheet were bound.

The thus obtained sheet material was coloured black and was pressed lightly with satin emboss to obtain a sheet material having fold, texture and resilience similar to those of natural calf.

EXAMPLE 2

The polyurethane elastomer to be used in this example was the same as described in Example 1.

Example 1 was repeated, except that a polyethylene sheet coated with the polyurethane elastomer solution was introduced into a coagulation bath kept at 70° C. at an angle of 90° to produce a porous polyurethane elastomer sheet.

The resulting sheet material was similar to natural calf having minute fold.

EXAMPLE 3

The polyurethane elastomer to be used in this example was the same as described in Example 1.

In an atmosphere kept at 30° C., 20% solution of polyurethane elastomer in DMF containing 3% of carbon black was flowed on a polyester film by a slit coat system so that the thickness of the elastomer solution was 0.8 mm., and then the sheet was introduced into water at 45° C. at a rate of 2 m./min. and at an angle of 35°, and the polyurethane elastomer was coagulated for 15 minutes. The coagulated polyurethane elastomer sheet adhered to the polyester base film was dried in hot air at 100° C.

The dried polyurethane elastomer sheet adhered to the base film was bound to cotton flannel by means of a two-liquid type polyurethane adhesive and the base film was removed, after which the surface of the elastomer sheet was finished to obtain a sheet material having fold similar to natural calf.

EXAMPLE 4

The polyurethane elastomer to be used in this example was the same as described in Example 1.

On a polyethylene sheet (support) was cast 12% solution of polyurethane elastomer in DMF at 30° C. and the sheet was introduced into water at 40° C. at an angle of 70° against the liquid surface to coagulate the polyurethane elastomer. The obtained polyurethane elastomer film had a thickness of 0.3 mm. and triangular macropores inclined at an angle of about 30° against the film surface and further had leather-like pattern on the surface faced to the support.

The resulting polyurethane film was bound to an unwoven fabric and subjected to a color finishing to obtain a flexible sheet material having a grain side and fold similar to those of natural leather.

EXAMPLE 5

The polyurethane elastomer to be used in this example was the same as described in Example 1.

On a polypropylene sheet (support) was cast 14% solution of polyurethane elastomer in DMF kept at 30° C. and the sheet was introduced into water at 50° C. at an angle of 85° against the liquid surface to coagulate the polyurethane elastomer.

The resulting porous film had triangular macropores inclined at an angle of about 50° against the film surface and further natural leather-like pattern on the surface faced to the support.

The resulting polyurethane film was dried under stretching about 2% to transverse direction, bound to an unwoven fabric and subjected to color finishing to obtain a flexible sheet material having a grain side quite similar to natural leather, and an excellent scratching resistance.

EXAMPLE 6

The polyurethane elastomer to be used in this example was the same as descrbied in Example 1.

On a polyethylene sheet (support) was cast 10% solution of polyurethane elastomer in DMF kept at 30° C. and the sheet was introduced into water at 70° C. at an angle of 80° against the liquid surface to coagulate the polyurethane elastomer, whereby a polyurethane film having a thickness of about 0.15 mm. was obtained. The film had triangular macropores inclined at angle of about 40° against the film surface and natural leather-like pattern on the surface faced to the support.

The resulting polyurethane film was bound to a substrate consisting of flexible unwoven fabric to obtain a flexible leather-like sheet material.

EXAMPLE 7

The polyurethane elastomer to be used in this example was prepared as follows:

624 parts of polyethylene propylene adipate having hydroxyl groups in both ends and a mean molecular weight of 1,916, 537 parts of tetramethylene oxide having hydroxyl groups in both ends and a mean molecular weight of 1,100, 715 parts of p,p'-diphenylmethane diisocyanate, 125 parts of ethylene glycol and 353 parts of DMF were treated in the same manner as described in Example 1 to obtain powdery polyurethane elastomer.

In an atmosphere kept at 50° C., 15% solution of polyurethane elastomer in DMF kept at 50° C., which had a viscosity of 15 poises at 30° C. and contained 3% of carbon black based on the polyurethane, was flowed on a polyethylene sheet by means of a slit coat system so that the thickness of said elastomer solution was 0.8 mm., and the sheet was introduced into water at 50° C. at an angle of 80°, and the polyurethane elastomer was coagulated for 15 minutes. The coagulated polyurethane elastomer adhered to the support was dried.

The resulting polyurethane film had a porous structure containing macropores inclined at an angle of about 50° and having a maximum diameter of 0.05–0.35 mm. and a length of 0.1–0.5 mm. which occupied more than ⅓ based on the volume of the total layer.

A flexible substrate was bound to a surface of the porous film, which did not face to the support, to obtain a leather-like sheet material.

EXAMPLES 8–11

Example 7 was repeated under conditions as shown in Table 1.

The polyurethane elastomer to be used in Example 8 was prepared as follows:

200 parts of polyethylene propylene adipate having hydroxyl groups in both ends and a mean molecular weight of 2,000, 92.5 parts of p,p'-diphenylmethane diisocyanate, 17.4 parts of ethylene glycol and 55 parts of DMF were treated in the same manner as described in Example 1 to obtain powdery polyurethane elastomer. This polyurethane elastomer was mixed with the polyurethane elastomer as described in the following Example 11 in a mixture ratio of 62.5:37.5. The resulting mixed polyurethane elastomer was used in this example.

The polyurethane elastomer to be used in Example 9 was prepared as follows:

100 parts of tetramethylene oxide having hydroxyl groups in both ends and a mean molecular weight of 1,000, 63 parts of p,p'-diphenylmethane diisocyanate and 8.7 parts of ethylene glycol were dissolved in 319 parts of DMF and the resulting solution was stirred at 70° C. and then added with 196 parts of DMF and the polymerization reaction was continued at 70° C. to obtain 25% solution of polyurethane elastomer in DMF.

The polyurethane elastomer to be used in Example 10 was prepared as follows:

100 parts of polybutylene adipate having hydroxyl groups in both ends and a mean molecular weight of 1,000, 62.5 parts of p,p'-diphenylmethane diisocyanate and 13.5 parts of butane diol-1,4 were mixed homogeneously at 60° C. and then the polymerization reaction was carried out at 80° C. for 3 hours to obtain polyurethane elastomer.

The polyurethane elastomer to be used in Example 11 was prepared as follows:

200 parts of polyethylene propylene adipate having hydroxyl groups in both ends and a mean molecular weight of 2,000, 195 parts of p,p'-diphenylmethane diisocyanate, 42.2 parts of ethylene glycol and 77 parts of DMF were treated in the same manner as described in Example 1 to obtain powdery polyurethane elastomer.

containing macropores inclined at an angle of about 50–70° and having a diameter of 0.1–0.3 mm. and a length of 0.2–0.4 mm. which occupied about ⅓ of the volume of the total layer.

TABLE 1

| Example | 8 | 9 | 10 | 11 |
|---|---|---|---|---|
| Polymer solution: | | | | |
| Polymer | Polyurethane | Polyurethane | Copolymer of polyurethane and polyvinyl chloride (9:1). | Polyurethane. |
| Additive | Titanium oxide | Carbon black | None | Carbon black. |
| Amount of additive added (based on the polymer, percent) | 3 percent | 3 | 0 | 3. |
| Concentration of solution, percent | 13 | 16 | 20 | 15. |
| Temperature of solution, °C | 40 | 40 | 50 | 50. |
| Viscosity of solution (at 30° C.), poises | 12 | 18 | 20 | 20. |
| Support | Unwoven fabric sheet impregnated with polyethylene. | Unwoven fabric sheet impregnated with polyethylene. | Nylon film | Polyethylene film. |
| Amount of polymer coated, g./m.² | 80 | 80 | 90 | 70. |
| Coagulation bath | 15% DMF aqueous solution | 5% DMF aqueous solution | Water | Water. |
| Temperature of coagulation bath, °C | 45 | 55 | 60 | 35. |
| Introducing angle, degree | 45 | 80 | 40 | 90. |
| Coagulation time, minutes | 8 | 10 | 15 | 5. |

The resulting films had a porous structure having macropores as shown in Table 2.

TABLE 2

| Example | 8 | 9 | 10 | 11 |
|---|---|---|---|---|
| Length of macropores, mm | 0.8–1.0 | 0.2–0.4 | 0.1–0.3 | 6–8 |
| Maximum diameter of macropores, mm | 0.5–0.6 | 0.1–0.3 | 0.1–0.2 | 0.8–0.9 |
| Volume occupied by the macropores | ¹⅓ | ¹⅓ | ¹⅓ | ¹⅓ |
| Inclined angle, degree | ¹10 | ¹50–70 | ¹45 | ¹3–5 |

¹ About.

EXAMPLE 12

The polyurethane elastomer elastomer to be used in this example was the same as described in Example 1.

In an atmosphere kept at 40° C., 15% solution of polyurethane elastomer in DMF having a viscosity of 13 poises at 45° C. and containing 3% of carbon black based on the polyurethane as a pigment was flowed on an unwoven fabric coated with polyethylene at a rate of 80 g./m.² in polymer amount by means of a slit coat system, and the unwoven fabric was introduced into 15% DMF aqueous solution kept at 45° C. at an angle of 45° and the polyurethane elastomer was coagulated for 10 minutes. Then the coagulated polyurethane elastomer adhered to the unwoven fabric support was dried.

The resulting polyurethane elastomer sheet had a porous structure having a specific gravity of 0.65 and containing macropores inclined at an angle of about 35° and having a diameter of 0.15–0.50 mm. and a length of 0.2–0.7 mm. which occupied about ⅓ of the volume of the total layer.

A flexible substrate was bound to a surface of the porous polyurethane elastomer sheet, which did not face to the support, and the upper surface of the porous polyurethane elastomer sheet was subjected to an embossing to obtain a leather-like sheet material.

EXAMPLE 13

The polyurethane elastomer to be used in this example was the same as described in Example 9.

In an atmosphere kept at 40° C., 15% solution of polyurethane elastomer in DMF having a viscosity of 18 poises at 45° C. and containing 3% of titanium oxide based on the polyurethane as a pigment was flowed on a polyethylene sheet at a rate of 80 g./m.² in polymer amount by means of a slit coat system, and then the polyethylene sheet was introduced into 5% DMF aqueous solution kept at 55° C. at angle of 80° and the polyurethane elastomer was coagulated for 12 minutes. Then the coagulated polyurethane elastomer adhered to the support was dried.

The resulting polyurethane elastomer sheet had a porous structure having a specific gravity of 0.55 and A flexible substrate was bound to a surface of the porous polyurethane elastomer sheet, which did not face to the support, and the upper surface of the porous polyurethane elastomer sheet was subjected to an embossing to obtain a leather-like sheet material.

EXAMPLE 14

The polyurethane elastomer to be used in this example was the same as described in Example 1.

In an atmosphere kept at 40° C., 15% solution of polyurethane elastomer in DMF having a viscosity of 13 poises at 45° C. and containing 3% of carbon black based on the polyurethane as a pigment was flowed on an unwoven fabric coated with polyethylene at a rate of 80 g./m.² in polymer amount by means of a slit coat system, and the unwoven fabric was introduced into 15% DMF aqueous solution kept at 45° C. at an angle of 45°, and the polyurethane elastomer was coagulated for 10 minutes. Then the coagulated polyurethane elastomer adhered to the unwoven fabric support was dried.

The resulting thin film had a spongy structure having a specific gravity of 0.65 and containing macropores inclined at an angle of about 35° and having a diameter of 0.15–0.50 mm. and a length of 0.2–0.7 mm. which occupied about ⅓ of the volume of the total layer.

A mixture of 50 parts of nylon-6 and 50 parts of polystyrene was spun, drawn, crimped and cut into staple fibers. The resulting staple fibers were needle-punched to produce an unwoven fibrous mat. The mat was impregnated with 25% solution of polyurethane elastomer in DMF, immersed in 40% DMF aqueous solution kept at 40° C. to coagulate the polyurethane elastomer, and treated in hot toluene to extract and remove polystyrene in the fiber. Then the surface of the mat was sliced to obtain a flexible substrate having a smooth surface.

This flexible substrate was bound to a surface of the above-mentioned thin layer, which did not face to the support, to obtain a leather-like sheet material.

EXAMPLE 15

The polyurethane elastomer to be used in this example was the same as described in Example 9.

In an atmosphere kept at 40° C., 16% solution of polyurethane elastomer in DMF having a viscosity of 18 poises at 40° C. and containing 3% of titanium oxide based on the polyurethane as a pigment was flowed on a polyethylene sheet at a rate of 80 g./m.² in polymer amount by means of a slit coat system, and the polyethylene sheet was introduced into 5% DMF aqueous solution kept at 55° C. at an angle of 80° and the polyurethane elastomer was coagulated for 10 minutes. Then the coagulated polyurethane elastomer adhered to the support was dried.

The resulting thin film had a spongy structure having a specific gravity of 0.60 and containing macropores inclined at an angle of about 50–70° and having a diameter of 0.1–0.3 mm. and a length of 0.2–0.4 mm. which occupied about ⅓ of the volume of the total layer.

The flexible substrate used in Example 14 was bound to a surface of the thin film, which did not face to the support, and the upper surface of the thin film was subjected to an embossing to obtain a leather-like sheet material.

EXAMPLE 16

The polyurethane elastomer to be used in this example was the same as described in Example 7.

In an atmosphere kept at 50° C., 15% solution of polyurethane elastomer in DMF kept at 50° C. which had a viscosity of 15 poises at 30° C. and contained 3% of carbon black based on the polyurethane as a pigment, was flowed on a polyethylene sheet by means of a slit coat system so that the thickness of said elastomer solution was 0.8 mm., and then the sheet was introduced into water kept at 50° C. at an angle of 80° and the polyurethane elastomer was coagulated for 15 minutes. The coagulated polyurethane elastomer adhered to the support was dried.

The resulting film had a spongy structure having a specific gravity of 0.45 and containing macropores inclined at an angle of about 50° and having a maximum diameter of 0.05–0.35 mm. and a length of 0.1–0.5 mm. which occupied about ⅓ of the volume of the total layer.

A mixture of 50 parts of nylon-6 and 50 parts of polystyrene was spun, drawn, crimped and cut into staple fibers. The resulting staple fibers were needle-punched to produce an unwoven fibrous mat. The mat was impregnated with 25% solution of polyurethane elastomer in DMF, immersed in 40% DMF aqueous solution kept at 40° C. to coagulate the polyurethane elastomer, and treated in hot toluene to extract and remove polystyrene in the fiber. Then the surface of the mat was sliced to obtain a flexible substrate having a smooth surface.

This flexible substrate was bound to a surface of the above-mentioned film, which did not face to the support, to obtain a leather-like sheet material.

EXAMPLE 17

The polyurethane elastomer to be used in this example was the same as described in Example 9.

In an atmosphere kept at 40° C., 15% solution of polyurethane elastomer in DMF having a viscosity of 18 poises at 45° C. and containing 3% of titanium oxide based on the polyurethane as a pigment was flowed on a polyethylene sheet at a rate of 80 g./m.$^2$ in polymer amount by means of a slit coat system, and the sheet was introduced into 5% DMF aqueous solution kept at 55° C. at an angle of about 80° and the polyurethane elastomer was coagulated for 12 minutes. The coagulated polyurethane elastomer adhered to the support was dried.

The resulting film had a spongy structure having a specific gravity of 0.55 and containing macropores inclined at an angle of about 50–70° and having a diameter of 0.1–0.3 mm. and a length of 0.2–0.4 mm. which occupied about ⅓ of the volume of the total layer.

The flexible substrate used in Example 16 was bound to a surface of the above obtained film which did not face to the support, and the upper surface of the film was subjected to an embossing to obtain a leather-like sheet material.

EXAMPLE 18

The polyurethane elastomer to be used in this example was the same as described in Example 1.

In an atmosphere kept at 40° C., 16% solution of polyurethane elastomer in DMF having a viscosity of 14 poises at 45° C. and containing 3% of carbon black based on the polyurethane as a pigment was flowed on an unwoven fabric coated with polyethylene at a rate of 80 g./m.$^2$ in polymer amount by means of a slit coat system, and then the unwoven fabric was immersed in 15% DMF aqueous solution kept at 45° C. After 20 seconds, a force of transverse direction was applied to the upper layer of the elastomer solution by means of roll in the bath to shift the upper layer, and the sheet was further treated in the bath for 10 minutes to complete the coagulation of polyurethane elastomer. The coagulated polyurethane elastomer adhered to the support was dried.

The resulting porous polyurethane elastomer sheet had a thickness of about 0.13 mm. and a specific gravity of about 0.60 and was composed of (a) a lower layer having a spongy structure of about 0.02 mm. thickness, (b) an inner layer having a spongy structure containing macropores inclined at an angle of about 40° and having a diameter of 0.15–0.50 mm. and a length of 0.2–0.7 mm. which occupied about ⅓ of the volume of the total layers, and (c) an upper layer having a spongy structure of about 0.05 mm. thickness, which contains pores having a diameter of about 0.01 mm. and a length of about 0.02–0.04 mm.

A flexible substrate was bound to the upper layer of this porous polymeric sheet and this porous polymeric sheet was subjected to an embossing to obtain a leather-like sheet material.

EXAMPLE 19

The polyurethane elastomer to be used in this example was the same as described in Example 9.

In an atmosphere kept at 40° C., 16% solution of polyurethane elastomer in DMF having a viscosity of 19 poises at 45° C. and containing 3% of carbon black based on the polyurethane as a pigment was flowed on a polyethylene sheet at a rate of 80 g./m.$^2$ in polymer amount by means of a slit coat system, and then the sheet was immersed in 5% DMF aqueous solution kept at 50° C. After 15 seconds, a force of transverse direction was applied to the upper layer of the elastomer solution by means of roll in the bath to shift the upper layer, and the sheet was further treated in the bath for 10 minutes to complete the coagulation of polyurethane elastomer. The coagulated polyurethane elastomer adhered to the support was dried.

The resulting porous polymeric sheet had a thickness of about 0.15 mm. and a specific gravity of about 0.55 and was composed of (a) a lower layer having a spongy structure of about 0.02 mm. thickness, (b) an inner layer having a spongy structure containing macropores inclined at an angle of about 50–70° and having a diameter of 0.10–0.30 mm. and a length of 0.2–0.4 mm. which occupied about ¼ of the volume of the total layers, and (c) an upper layer having a spongy structure of about 0.05 mm. thickness containing pores having a diameter of about 0.01 mm. and a length of 0.02–0.04 mm.

EXAMPLE 20

The polyurethane elastomer to be used in this example was the same as described in Example 7.

In an atmosphere kept at 50° C., 15% solution of polyurethane elastomer in DMF kept at 50° C., which had a viscosity of 15 poises at 30° C., and contained 3% of carbon black based on the polyurethane as a pigment, was flowed on a polyethylene sheet by means of a slit coat system so that the thickness of the elastomer solution was 0.8 mm., and then the sheet was immersed in 5% DMF aqueous solution kept at 50° C. After 20 seconds, the upper layer of the elastomer solution was contacted with roll to shift transversely and the sheet was further treated for 15 minutes in the bath to coagulate the polyurethane elastomer. The coagulated polyurethane elastomer adhered to the support was dried.

The resulting polymeric sheet had a spongy structure containing macropores inclined at an angle of about 20–30° and having a maximum diameter of 0.15–0.50 mm. and a length of 0.3–0.8 mm. which occupied more than ⅓ of the volume of the total layer.

A flexible substrate was bound to a surface of the polymeric sheet, which did not face to the support, to obtain a leather-like sheet material.

EXAMPLE 21

The polyurethane elastomer to be used in this example was the same as described in Example 1.

In an atmosphere kept at 45° C., 15% solution of polyurethane elastomer in DMF having a viscosity of 13 poises at 45° C. and containing 3% of titanium oxide based on the polyurethane was flowed on an unwoven fabric sheet coated with polyethylene at a rate of 80 g./m.$^2$ in polymer amount, and then the sheet was immersed in 15% DMF aqueous solution kept at 45° C. After 25 seconds, the upper layer of the elastomer solution was contacted with roll in the bath, whereby a force of transverse direction was applied to the upper layer to shift the layer, and the sheet was further treated for 10 minutes to complete the coagulation of polyurethane elastomer. The coagulated polyurethane elastomer adhered to the support was dried after removing most of the DMF remained by washing it with water in 20 minutes.

The resulting polymeric sheet had a spongy structure having a specific gravity of 0.35 and containing macropores inclined at an angle of about 35° and having a diameter of 0.15–0.50 mm. and a length of 0.2–0.7 mm. which occupied about ⅓ of the volume of the total layer.

A flexible substrate was bound to a surface of the polymeric sheet, which did not face to the support, and the polymeric sheet was subjected to an embossing to obtain a leather-like sheet material.

What is claimed is:

1. A porous flexible synthetic polymeric organic resin sheet with the majority of the pores extending from surface to surface and inclined uniformly at an angle of less than 80° and more than 10° against the plane of the sheet and having a length of 0.03 to 10 mm.

2. The porous polymeric sheet as claimed in claim 1, wherein a diameter of said pores is 0.003 to 1.0 mm., a specific gravity of said sheet is less than 0.7 and a thickness of 0.05 to 2.0 mm.

3. A porous flexible synthetic polymeric organic resin sheet, which comprises (a) a lower portion having microporous structure and a thickness of 0.01 to 0.1 mm., (b) an inner portion having a porous structure, wherein the majority of pores extend from surface to surface and are inclined uniformly at an angle of less than 80° and more than 10° against the plane of the sheet and having a length of 0.03 to 10 mm. and a diameter of 0.03 to 1.0 mm., and (c) an upper portion having porous structure, which contains pores having a diameter of 0.005 to 0.05 mm. and a length of 0.005 to 0.15 mm., and a thickness of 0.01 to 0.1 mm., a thickness of said sheet being 0.05 to 2.0 mm. and a specific gravity of such sheet being less than 0.7.

4. A sheet material which comprises a porous flexible synthetic polymeric organic resin sheet with the majority of the pores extending from surface to surface and inclined uniformly at an angle of less than 80° and more than 10° against the plane of the sheet and having a length of 0.03 to 10 mm., and a substrate bound to the lower surface of the said porous polymeric sheet.

5. The sheet material as claimed in claim 4, wherein said porous polymeric sheet contains pores having a diameter of 0.003 to 1.0 mm. and has a specific gravity of less than 0.7 and a thickness of 0.05 to 2.0 mm.

6. A sheet material which comprises (1) a porous flexible synthetic polymeric organic resin sheet having a thickness of 0.05 to 2.0 mm. and a specific gravity of less than 0.7 which consists of (a) a lower portion having a microporous structure and a thickness of 0.01 to 0.1 mm., (b) an inner portion having a porous structure wherein the majority of the pores extend from surface to surface and are inclined uniformly at an angle less than 80° and more than 10° against the plane of the sheet and having a length of 0.03 to 10 mm., and a diameter of 0.03 to 1.0 mm. and (c) an upper portion having a porous structure and a thickness of 0.01 to 0.1 mm. which contains pores having a diameter of 0.0005 to 0.05 mm. and a length of 0.0005 to 0.15 mm. and (2) a substrate bound to the lower surface of the porous polymeric sheet.

References Cited

UNITED STATES PATENTS

| 1,759,976 | 5/1930 | Cummings | 161—DIG. 2 |
|---|---|---|---|
| 1,955,083 | 4/1934 | Müller | 161—159 X |
| 2,772,995 | 12/1956 | Wilson | 161—DIG. 2 |
| 2,801,674 | 8/1957 | Swerlick | 161—DIG. 2 |
| 2,903,387 | 9/1959 | Wade | 156—79 X |
| 3,264,761 | 8/1966 | Johnson | 161—161 X |
| 3,284,274 | 11/1966 | Hulslander et al. | 156—77 X |
| 3,369,925 | 2/1968 | Matsushita Itami et al. | 117—63 |
| 3,379,658 | 4/1968 | Kemper | 161—159 X |
| 3,459,274 | 8/1969 | MacPhail | 156—78 X |

FOREIGN PATENTS

| 586,270 | 11/1959 | Canada | 161—159 |

JOHN T. GOOLKASIAN, Primary Examiner

C. B. COSBY, Assistant Examiner

U.S. Cl. X.R.

161—139, 165, 190; 260—25 A